United States Patent [19]

Nakamura et al.

[11] Patent Number: 5,631,695
[45] Date of Patent: May 20, 1997

[54] ENDOSCOPE WITH SMEAR EXTRACTION AND CORRECTION

[75] Inventors: Kazunari Nakamura, Hino; Keiichi Hiyama, Akishima, both of Japan

[73] Assignee: Olympus Optical Co., Ltd., Tokyo, Japan

[21] Appl. No.: 280,468

[22] Filed: Jul. 26, 1994

[30] Foreign Application Priority Data

Oct. 18, 1993 [JP] Japan ..................... 5-260153

[51] Int. Cl.⁶ .................. H04N 7/18; A61B 1/00
[52] U.S. Cl. .................. 348/65; 348/249
[58] Field of Search .............. 348/65, 67, 68, 348/74, 248, 249

[56] References Cited

U.S. PATENT DOCUMENTS

| | | | |
|---|---|---|---|
| 4,010,319 | 3/1977 | Levine | 358/213 |
| 4,490,744 | 12/1984 | Levine | 358/213 |
| 4,558,366 | 12/1985 | Nagumo | 358/213 |
| 4,567,524 | 1/1986 | Levine | 358/213 |
| 4,864,407 | 9/1989 | Mulder | 358/213.24 |
| 4,901,143 | 2/1990 | Uehara et al. | 348/208 |
| 5,032,913 | 7/1991 | Hattori et al. | 348/70 |
| 5,049,989 | 9/1991 | Tsuji . | |
| 5,089,894 | 2/1992 | Higashitsutsumi | 358/213.24 |
| 5,420,644 | 5/1995 | Watanabe | 348/588 |

FOREIGN PATENT DOCUMENTS

| | | |
|---|---|---|
| 60-85727 | 5/1985 | Japan . |
| 1-200783 | 8/1989 | Japan . |

Primary Examiner—Tommy P. Chin
Assistant Examiner—Bryan S. Tung
Attorney, Agent, or Firm—Armstrong, Westerman, Hattori, McLeland & Naughton

[57] ABSTRACT

An image processing apparatus for an endoscope including a smearing component extraction device for extracting a smearing component caused by a high luminance light beam from an original image composed of an image signal of a subject to be imaged. The image processing apparatus also includes a device for correcting the original image composed of the image signal by use of the signal of the smearing component extracted by the smearing component extraction device and reduces or eliminates smearing when a laser treatment is carried out to thereby improve the quality of an image to be observed.

31 Claims, 15 Drawing Sheets

ENDOSCOPE WITH SMEAR EXTRACTION AND CORRECTION

BACKGROUND OF THE INVENTION

1. Field of the Invention

The present invention relates to an endoscope image processing apparatus for reducing or eliminating a smearing component in an imaging signal produced in an imaging means which is caused by a high luminance light beam such as a laser beam for a treatment.

2. Description of the Related Art

Recently, endoscopes have been widely used to observe organs in a body cavity by inserting a slender inserting portion into the body cavity and to carry out various medical treatments by using a treatment device inserted through a treatment device channel when necessary.

Sometimes, a medical treatment is carried out by inserting a laser beam guide probe for executing a laser treatment as one of treatment devices though the treatment device channel.

Further, various video scope systems using a solid imaging device as imaging means such as a charge coupled device (CCD) have been proposed.

Japanese Patent Unexamined Publication No. 60-85727 (1985) discloses a countermeasure for image deterioration caused by halation in an imaging apparatus for imaging an image of an endoscope. This publication discloses a transendoscope imaging apparatus for reducing a charge accumulation time of picture element cells to halation by controlling the charge accumulation time of a solid imaging device to the picture element cells for each block thereof.

Japanese Patent Unexamined Publication No. 1-200783 (1989) discloses a circuit having the following circuit arrangement as a bright point reduction circuit. The reduction circuit detects a bright point component of a video signal having passed through a BPF (band pass filter) or an HPF (low pass filter) by a bright point detection circuit as well as restricting the bright point component of the video signal passing though a bright point suppression circuit by use of the detected bright point component.

When a treatment is to be carried out by a laser probe under a trans-endoscope, halation is caused in an observation screen by a laser beam. Because the laser beam is irradiated while a solid imaging device transfers image data, smearing is caused in the screen by the laser beam and adversely affects the observation screen.

The aforesaid solid imaging device includes a charge transfer type imaging device represented by a CCD (charge coupled device) and a significant amount of smearing is produced in this transfer type device.

The CCD as the charge transfer type device generally includes an FT (frame transfer) system and an ILT (interline transfer) system which are mounted not only on endoscopes but also on video cameras. A CCD employing the FT system shown in FIG. 4(a) includes photosensitive units 51 having a plurality of picture element cells for subjecting an incident light beam to photo-electric conversion, shaded accumulation units 52 for transferring charge accumulated by the photosensitive unit 51, and a shaded output unit 53 composed of a reading register.

A CCD employing the ILT system shown in FIG. 4 (b) includes photosensitive units 54 having a plurality of picture element cells for subjecting an incident light beam to photo-electric conversion and accumulation units 55 for successively transferring charge accumulated by the photosensitive units 55, the photosensitive units 54 and the accumulation units 55 being alternately disposed, and an output unit 56 for outputting signal charge read with respect to each line from the accumulation units 55.

Although the FT system CCD has a chip the size of which is made relatively large and cannot intrinsically prevent photographic fog caused at the photosensitive units even if a transfer speed is increased. Thus, although interference is liable to occur, the FT system CCD has a good light utilizing efficiency. On the other hand, the ILT system CCD is contrary to the FT system CCD.

As shown in FIG. 2, an output image shown in FIG. 1 is an image when a CCD 50 images a subject to which a laser beam spot is irradiated and smearing occurs therein.

FIG. 3(a)–FIG. 3(d) schematically show a state in which smearing occurs and FIG. 3(a) and FIG. 3(c) are cross sections in the transfer direction of the CCD. Further, FIG. 3(b) and FIG. 3(d) show the states of image data.

First, a laser beam (actually, reflected right thereof) is incident on the CCD 50 during an exposure period as shown in the upper portion of FIG. 3(a). Next, as shown in the middle portion of FIG. 3(a), transfer of charge is started and the charge accumulated in the photosensitive units during an exposure period is successively transferred. Signal charge, which was produced by a light beam continuously incident on the photosensitive units during the reading period of the CCD, is added to previously transferred charge and a false signal is detected and thus smearing occurs. FIG. 3(b) schematically shows the state of image data after the completion of the transfer. More specifically, smearing occurs in an image at the upper portion of the position where a laser beam was irradiated (the position where transferred charge which passed through the laser irradiated position was previously accumulated).

The lower portion of FIG. 3(a) shows the state of the CCD just before the second transfer and the transfers to be executed thereafter, wherein charge caused by being exposed by a laser beam in the first transfer process remains at the lower portion in a transfer direction (on a route through which charge at a laser irradiated position passes). Then, the second transfer is completed through the respective steps of in process of exposure, transfer start and transfer end shown in the upper view, middle portion, and lower view of FIG. 3(c). Therefore, image data obtained after the completion of transfer includes a false signal resulting from the remaining charge in the first transfer in addition to the charge accumulated by the continuously incident laser beam, as shown in FIG. 3(d). As a result, smearing occurs linearly in the transfer direction, i.e., in a vertical scan line direction, as shown in FIG. 1. The smearing occurs in a white band shape having a width corresponding to a spot diameter of a laser beam, and makes an observation screen very difficult to observe and adversely affects the diagnosis of an image.

OBJECTS AND SUMMARY OF THE INVENTION

An object of the present invention is to provide an image processing apparatus for an endoscope for reducing or eliminating a smearing component caused when a high luminance light beam is irradiated which cannot be improved by the reduction of halation executed by a conventional bright point reduction circuit to thereby improve the quality of an image to be observed when the high luminance light beam is irradiated.

Another object of the present invention is to reduce or eliminate a smearing component caused when a high luminance light beam such as a laser beam is irradiated, to improve the quality of an image, to improve an observation capability when the high luminance light beam is irradiated for a laser treatment and to reduce a fatigue in a diagnosis and a treatment.

Still another object of the present invention is to provide an image processing apparatus for an endoscope for significantly reducing or eliminating only a smearing component contained in an output from imaging means or image recording means to thereby improve the quality of an image to be observed when a high luminance light beam is irradiated.

A further object of the present invention is to provide an image processing apparatus for an endoscope which does not eliminate a halation component caused by an illumination light beam for observation, which is irradiated to a subject but reduces or eliminate a smearing component caused by other high luminance light beams to thereby improve the quality of an image to be observed when the high luminance light beam is irradiated.

A still further object of the present invention is to provide an image processing apparatus for an endoscope for reducing or eliminating a smearing component caused by a laser beam as a high luminance light beam to thereby improve the quality of an image to be observed when the laser beam is irradiated.

A further object of the present invention is to provide an image processing apparatus for an endoscope for reducing or eliminating a smearing component caused by a laser beam or a guide beam as a high luminance light beam to thereby improve the quality of an image to be observed even if any one of the laser beam and the guide beam is irradiated.

An image processing apparatus for an endoscope comprises a smearing component extraction means for extracting a smearing component caused by a high luminance light beam from an original image composed of an electric signal output from imaging means which receives a light beam and subjects the light beam to photo-electric conversion and correction means for correcting the electric signal output from the imaging means by use of the signal of the smearing component extracted by the smearing component extraction means.

BRIEF DESCRIPTION OF THE DRAWINGS

FIG. 5 to FIG. 13(b) relate to a first embodiment of the present invention, in which:

FIG. 5 is a block diagram schematically showing the embodiment;

FIG. 7 is a view explaining the schematic arrangement and operation of an LT system CCD;

FIG. 8 is a block digram of an image processing apparatus;

FIG. 9 is a view explaining a trans-endoscope treatment executed by a laser beam;

Figure 10:
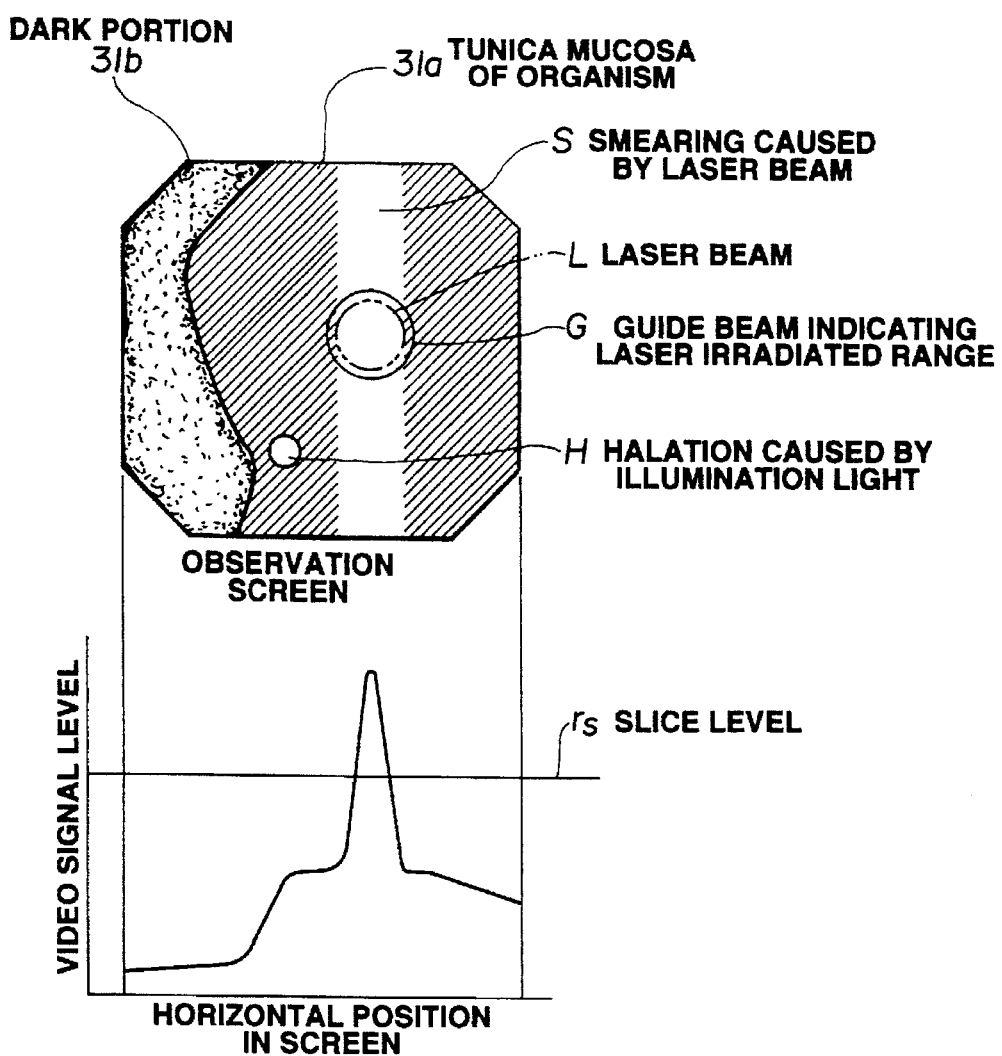
Figure 11:
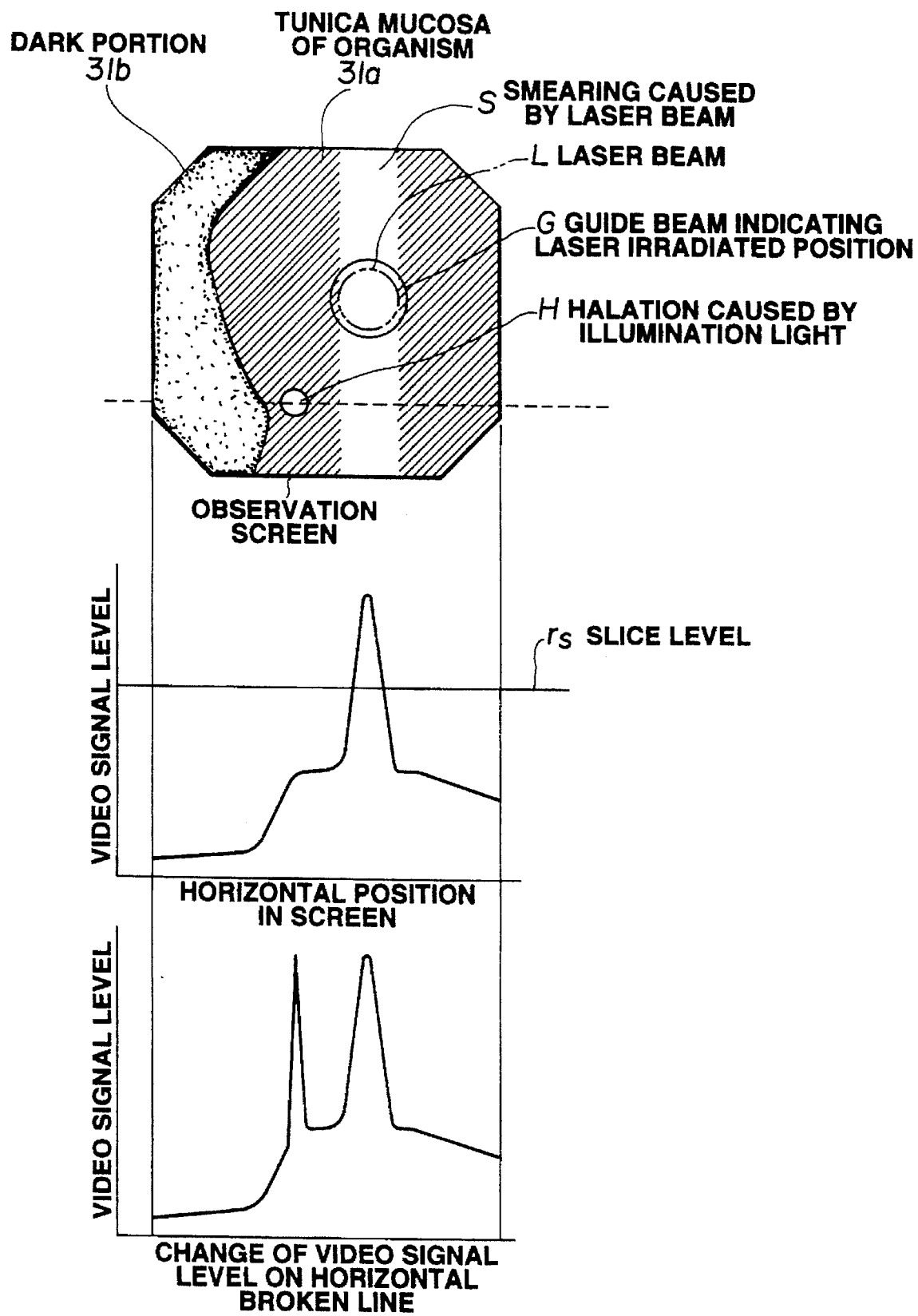
Figure 12A:
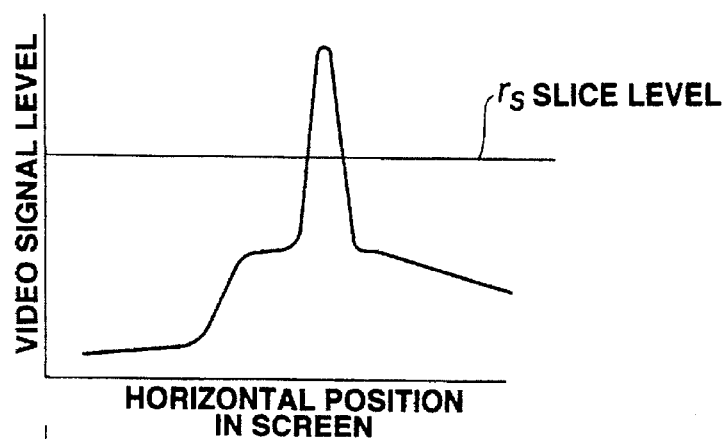
Figure 12B:
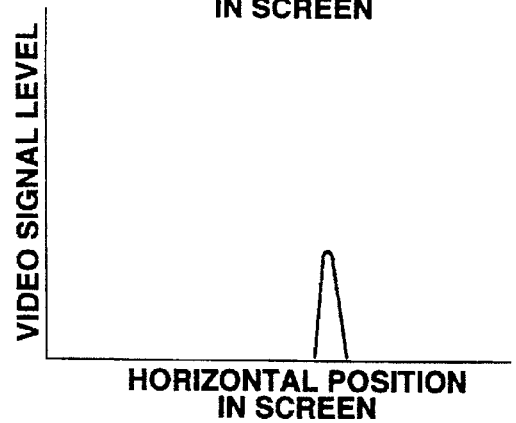
Figure 12C:
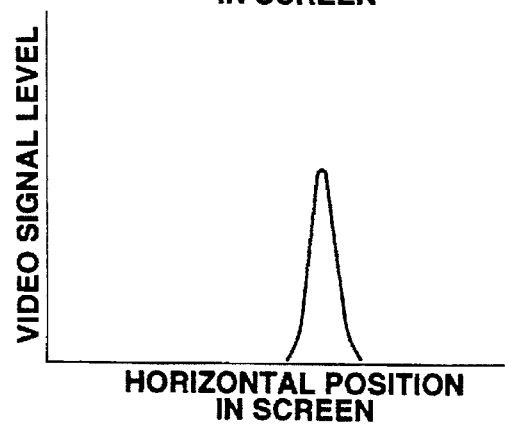
Figure 12D:
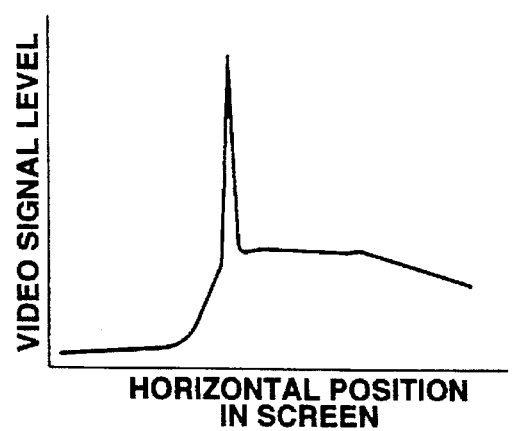
Figure 13A:
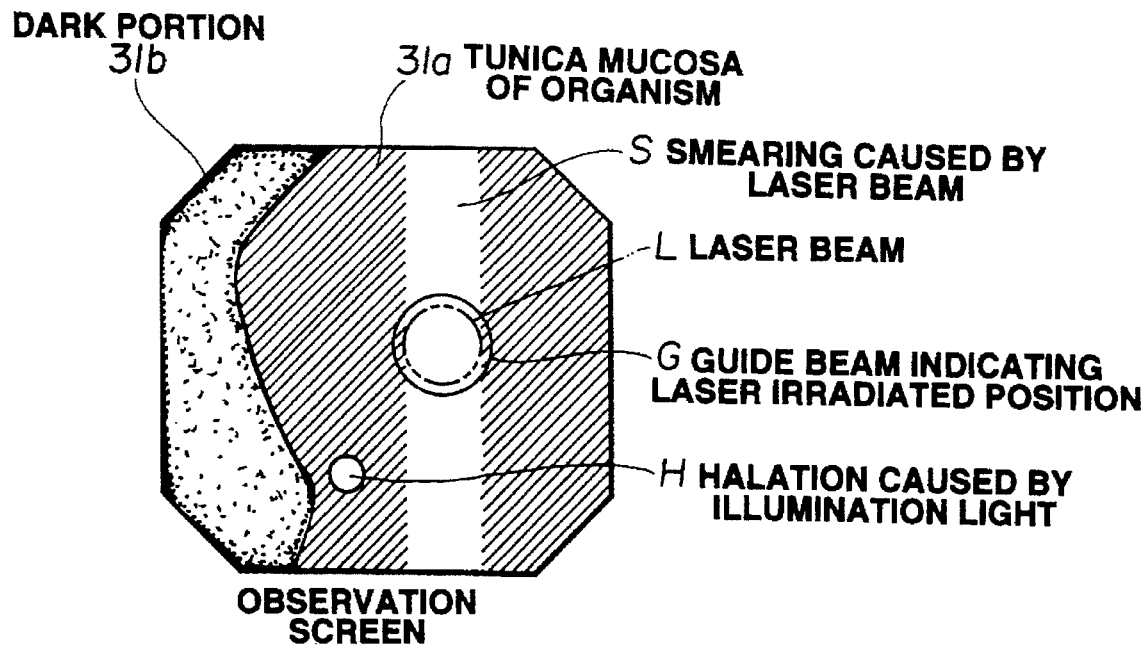
Figure 13B:
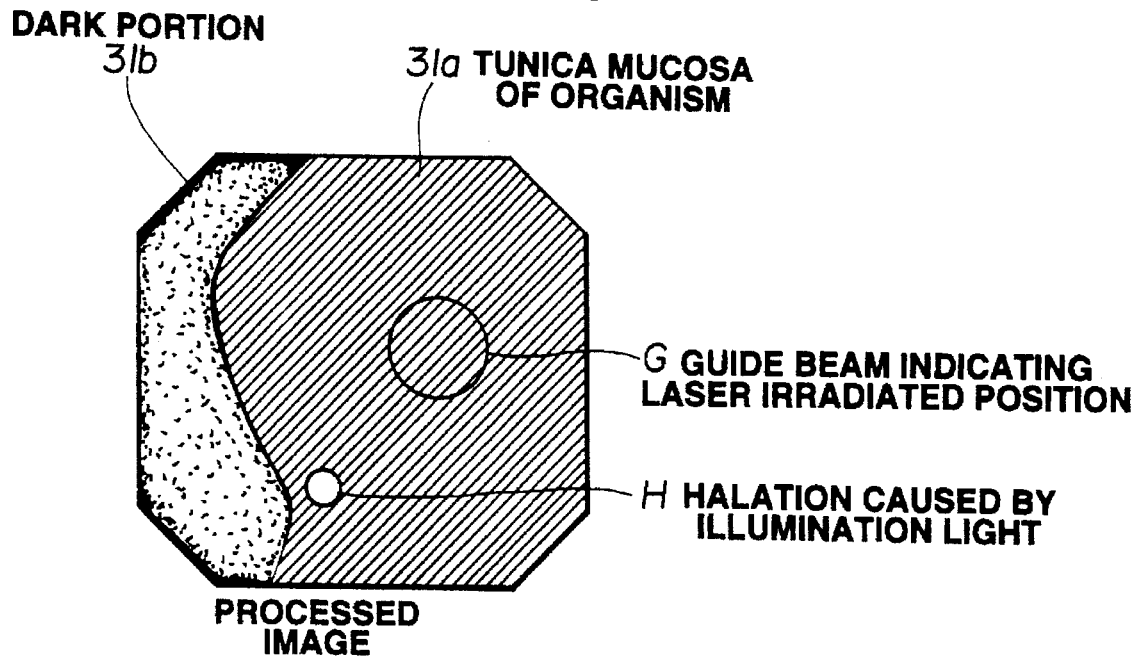
Figure 14:
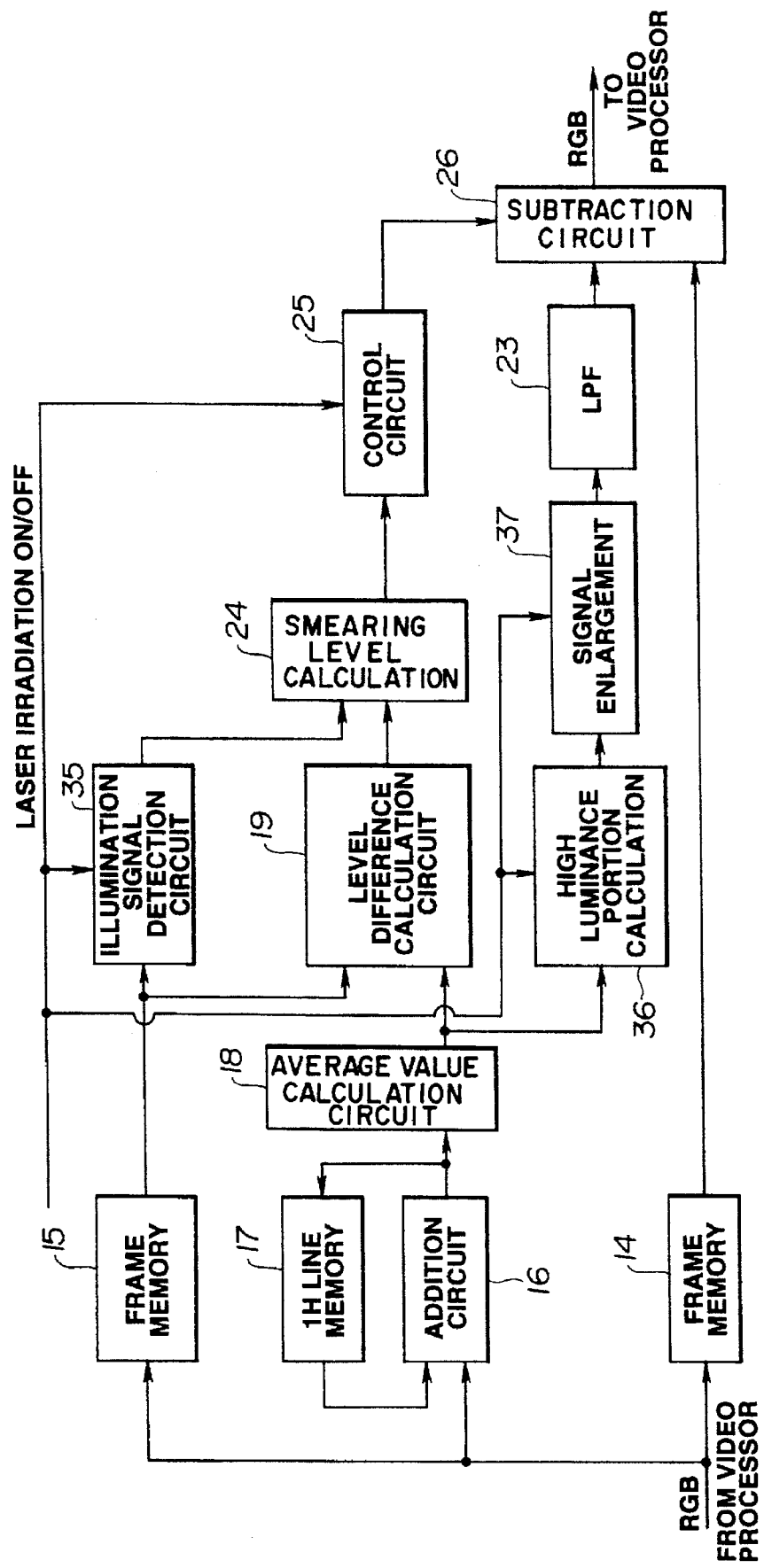
Figure 15:
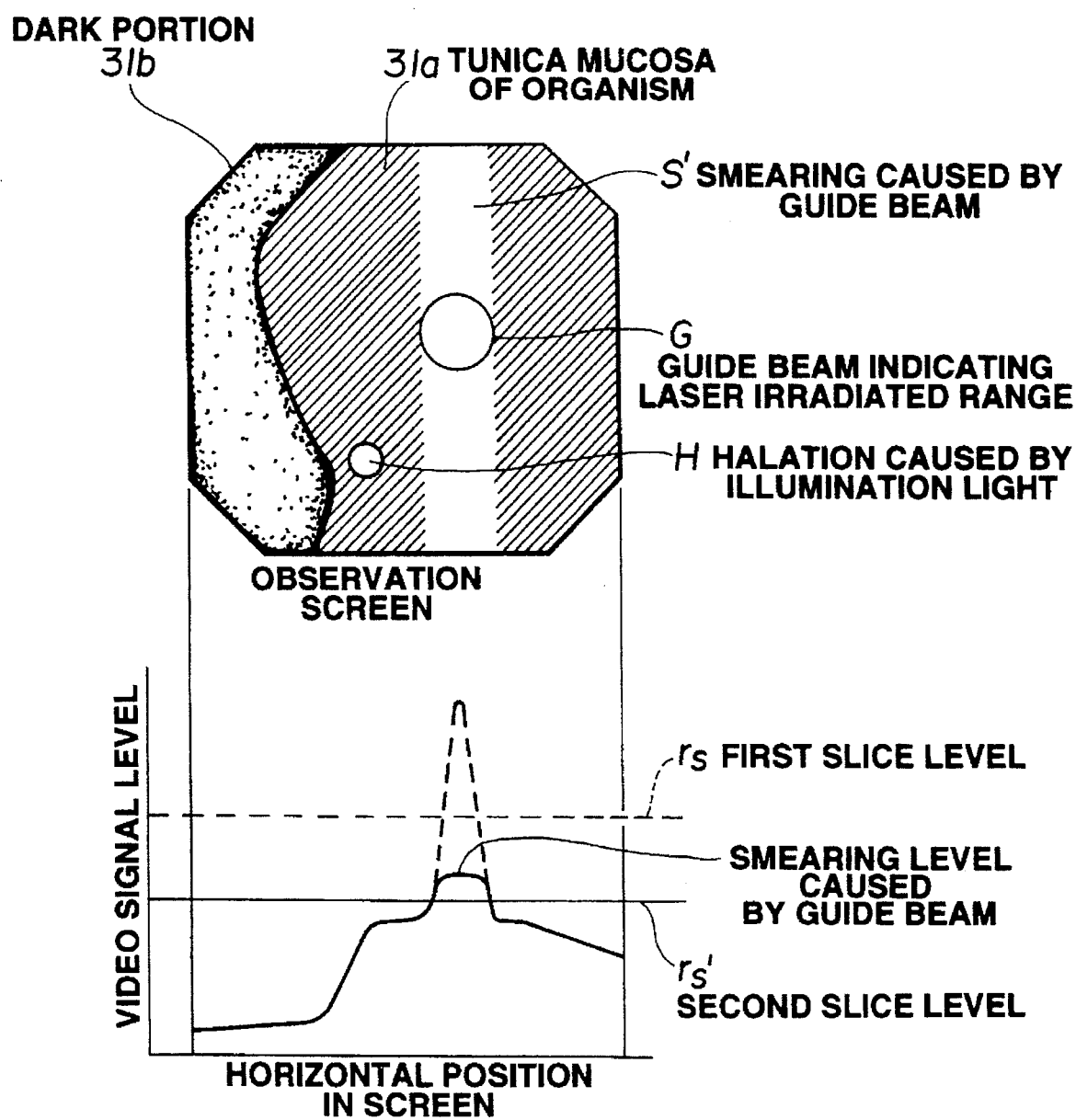
Figure 16A:
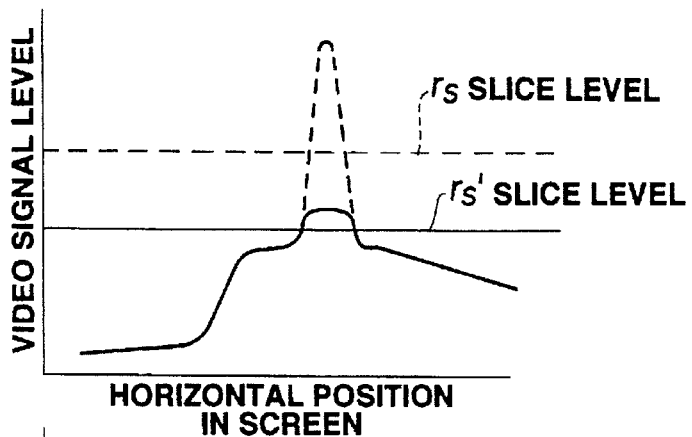
Figure 16B:
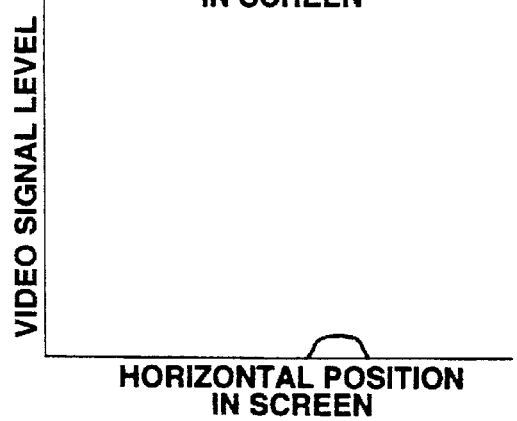
Figure 16C:
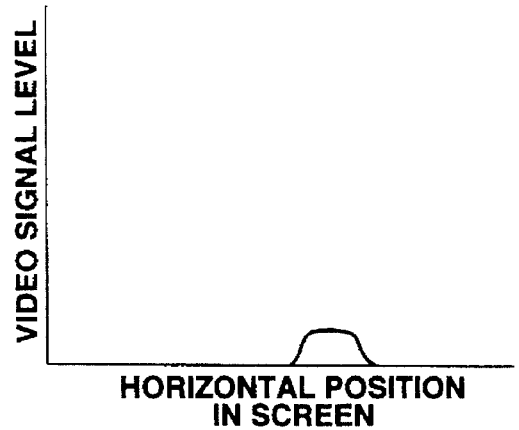
Figure 16D:
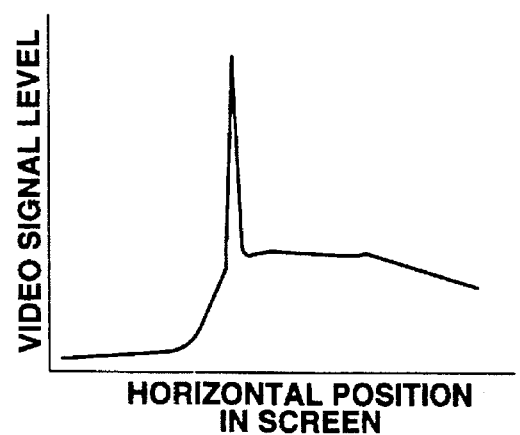
Figure 17A:
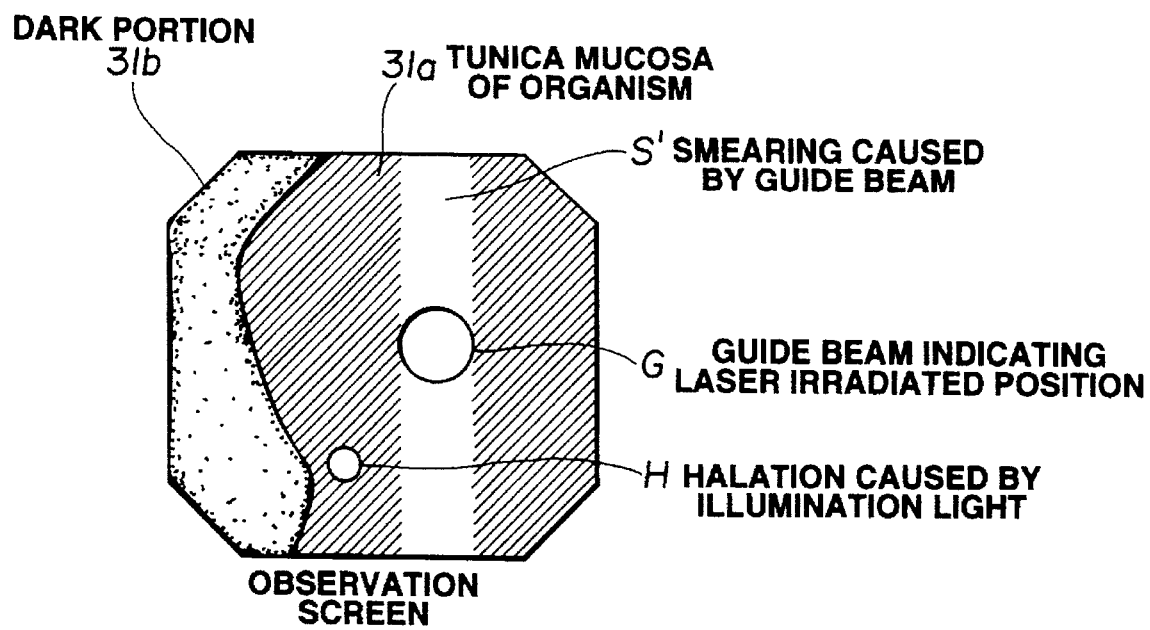
Figure 17B:
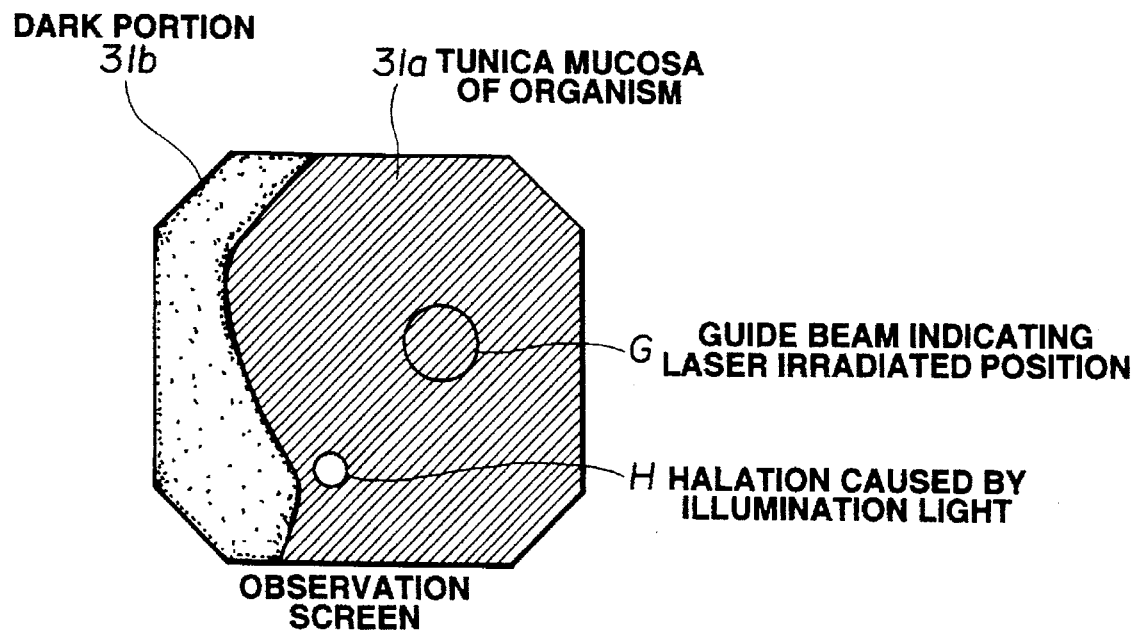

The upper portion of FIG. 10 is a view of an image in which halation and smearing occur and the lower portion is a waveform diagram showing a video signal level on a horizontal line and;

The upper portion of FIG. 11 is a view of a screen explaining the operation of an average value calculation circuit; the middle portion is a waveform diagram showing a video signal level on a horizontal line including smearing; and the lower portion is a waveform diagram showing a video signal level on a horizontal line including smearing and halation caused by a laser beam;

FIG. 12(a) is a waveform diagram showing an output level of the average value calculation circuit; FIG. 12(b) is a waveform diagram showing an output level of a high luminance portion calculation circuit; FIG. 12(c) is a waveform diagram showing an output level of a LPF; and FIG. 12(d) is a waveform diagram showing an output level of a correction circuit; and FIG. 13(a) is a view of an original image including halation, smearing and the like and FIG. 13(b) is a comparison view showing an image after the original image has been corrected;

FIG. 14–FIG. 17(b) relate to a second embodiment, in which:

FIG. 14 is block diagram of an image processing apparatus;

The upper portion of FIG. 15 is a view showing an image in which smearing and halation are caused by a guide beam and the lower portion is a waveform diagram showing a video signal level in a horizontal direction;

FIG. 16(a) is a waveform diagram showing an output level of an average value calculation circuit; FIG. 16(b) is a waveform diagram showing an output level of a high luminance portion calculation circuit; FIG. 16(c) is a waveform diagram showing an output level of a LPF; and FIG. 16(d) is a diagram showing an output level of a correction circuit; and FIG. 17(a) is a view of an original image containing halation, and smearing and the like caused by a guide beam and FIG. 17(b) is a comparison view showing an image after the original image has been corrected.

DESCRIPTION OF THE PREFERRED EMBODIMENTS

An embodiment of the present invention will be described below with reference to the accompanying drawings.

First, a schematic arrangement showing a concept of this embodiment will be described.

Figure 1:
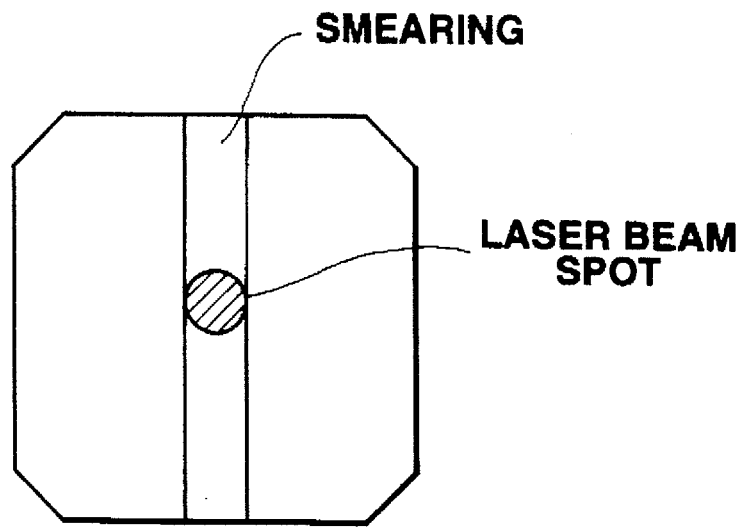
FIG. 1 is a view explaining an image in which smearing occurs in the prior art.
Figure 2:
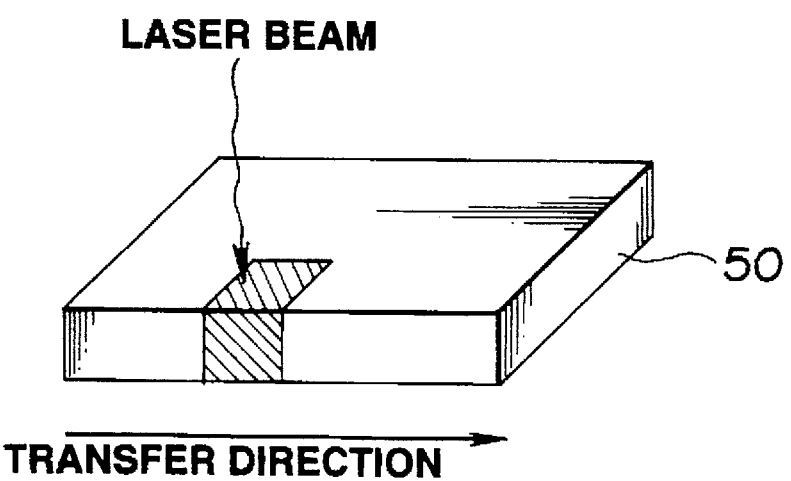
FIG. 2 is a view explaining the state of a CCD to which a laser beam is irradiated in the prior art.
Figure 3A:
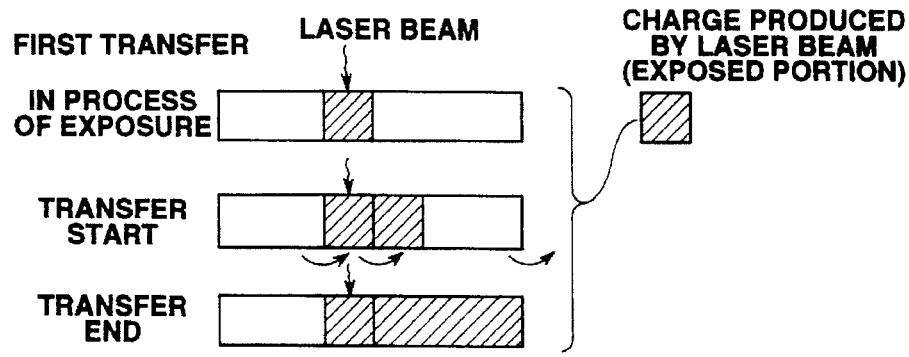
FIG. 3(a) is a view explaining the process states of first exposure, transfer start and transfer end in the prior art.
Figure 3B:
FIG. 3(b) is a view explaining an image resulting from a first transfer in the prior art.
Figure 3C:
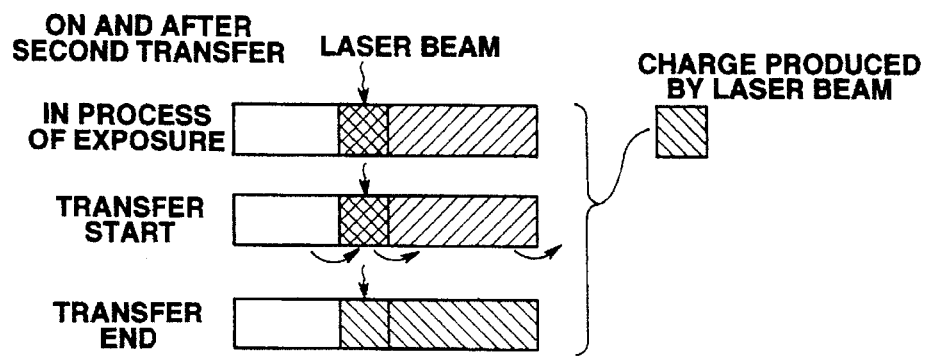
FIG. 3(c) is a view explaining the respective process states of second exposure, transfer start and transfer end in the prior art.
Figure 3D:
FIG. 3(d) is a view explaining an image resulting from a second transfer in the prior art.
Figure 4A:
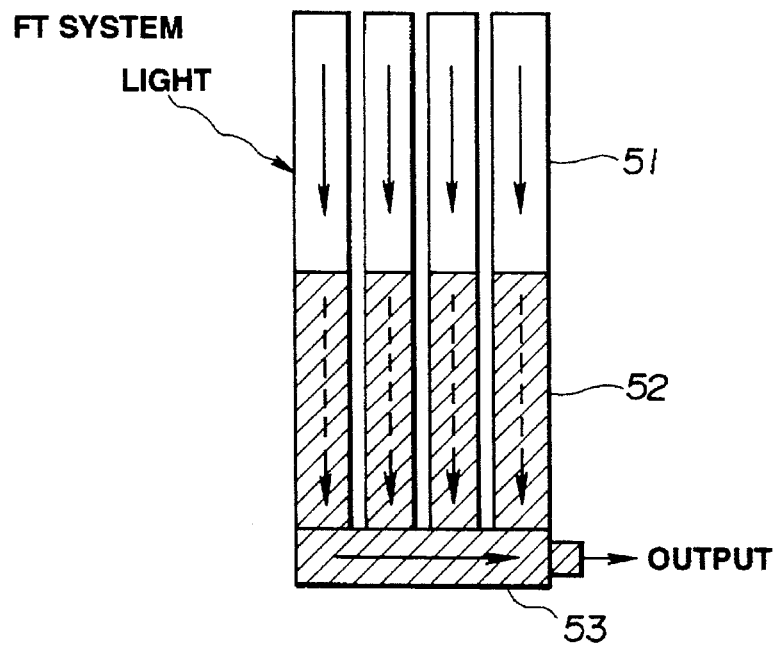
FIG. 4(a) is a schematic view showing the arrangement of a FT system CCD in the prior art and FIG. 4(b) is a schematic view showing the arrangement of an ILT system CCD in the prior art.
Figure 4B:
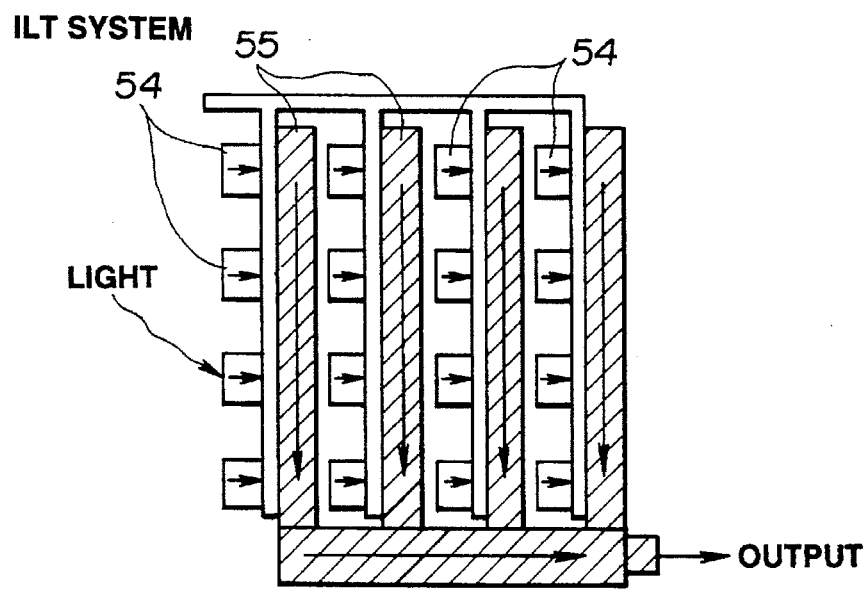
Figure 5:
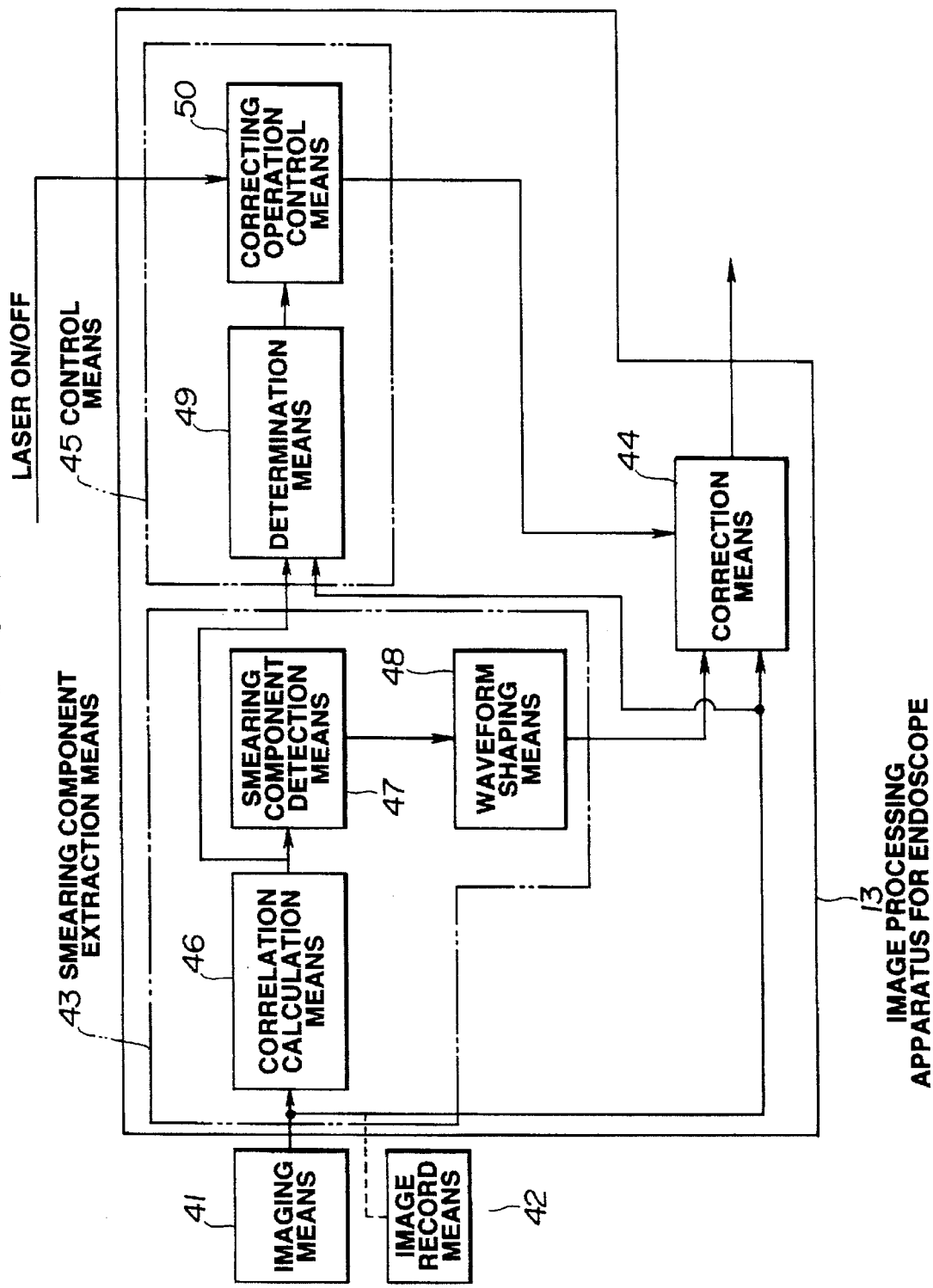

An image processing apparatus for an endoscope 13 shown in FIG. 5 is connected to imaging means 41 which is, for example, a solid imaging device or to image record means 42, which is, for example, an optical information record/reproduction unit and removes or eliminates a smearing component contained in a signal output from the imaging means 41 or the image record means 42 to thereby improve the quality of an image to be observed. The imaging means 41 is mounted to an externally attached camera which is coupled with the eyepiece unit of an electronic endoscope or an optical fiber endoscope so as to form an image shown by the endoscope. The image record means 42 records and stores an image shown by the endoscope which is imaged by the imaging means 41 and can further reproduce the image when necessary.

The image processing apparatus 13 includes a smearing component extraction means 43 for receiving a signal output from the imaging means 41 or the image record means 42 and extracting a smearing component caused by a high luminance light beam contained in an original image composed of the signal and correction means 44 for correcting the original image by using the signal of the smearing component extracted by the smearing component extraction means 43. Further, the image processing apparatus 13 includes control means 45 for controlling whether or not the correction means 44 is to carry out a correcting operation according to at least one of the condition that whether or not a particular light beam of high luminance light beams is irradiated and the condition that smearing is caused by a particular high luminance light in an original image.

The smearing component extraction means 43 includes correlation calculation means 46 for taking a predetermined correlation in a direction in which smearing occurs in the original image and removing a component having a small correlation in the direction in which smearing occurs and smearing component detection means 47 for detecting as the smearing component values greater than a predetermined level from the image from which the component having the small correlation has been removed by the correlation calculation means 46.

The smearing component extraction means 43 further includes waveform shaping means 48 for shaping the waveform of an output from the smearing component detection means 47 so that the output is substantially similar to the smearing component in the original image and supplies an output from the waveform shaping means 48 to the correction means 44 as a smearing component.

The control means 45 includes a determination means 49 for determining whether or not smearing caused by a particular high luminance light beam occurs by comparing an output from the smearing component extraction means 46 with an original image so as to compare an image from which a component having a small correlation in a direction in which smearing occurs in the original image is removed with the original image and correcting operation control means 50 for controlling a correcting operation executed by the correction means 44 based on a result of determination of the determination means 49.

In the above arrangement, a predetermined correlation of an original image, which is input to the correlation calculation means 46 of the smearing component extraction means 43, is taken in a direction in which a smearing component is caused depending upon the characteristics of the imaging means so that a component caused by a light beam of high luminance light beams which is out of an object and does not cause smearing is removed. Values equal to or greater than a predetermined level are detected as the smearing component from an image obtained by removing the component out of the object from the original image by the smearing component calculation means 47 and the waveform of the detected smearing component is shaped so that it is substantially similar to an actual smearing component caused in the original image.

When a solid imaging device is used as the imaging means 41, since a smearing component is produced according to the characteristics of the device, i.e., in a direction in which charge is transferred, a direction in which the smearing component is produced can be specified. In this embodiment, a line correlation is taken in the direction in which the smearing component is produced. Although smearing occurs substantially uniformly in a certain direction and has a width near to a high luminance light beam by which the smearing is produced, a high luminance portion caused by other factors such as, for example, halation is caused only at a specific portion. This embodiment determines a correlation function for each line by making use of such a characteristic and detects smearing after excluding a high luminance portion such as halation and the like. If a high luminance light beam by which smearing is produced is specified, a level of smearing caused thereby can be specified, and thus the smearing can be easily detected. That is, the smearing can be detected by setting a threshold value to a level by which erroneous detection is prevented. Values equal to or greater than, for example, a reference luminance level as the threshold value are detected as a smearing component.

It should be noted that although the threshold value may be set to the lowest smearing level, the threshold value is preferably set to a higher level so that other components, i.e. a component reflecting the image of a subject are not erroneously as a smearing level. For this purpose, a waveform shaping means is basically needed.

A laser beam is used in the field of an endoscope for a medical treatment and the laser beam is an example of a specific high luminance light of high luminance light beams which produces smearing.

The specific high luminance light beam includes the following example in addition to a laser beam. That is, this is a case in which an instrument is used to measure an amount of blood and a saturated degree of oxygen in hemoglobin by a spectral characteristic of the tunica mucosa of an organism under a trans-endoscope, i.e., by a difference of a degree of light absorption to a specific wavelength. Although a light beam is irradiated to the organism from the probe of the instrument, the light beam is not in synchronism with an RGB rotary filter provided with a successively plane illuminating light source and irradiated thereto even during a period when the RGB rotary filter is shaded. Consequently, smearing occurs similarly to the case in which a laser beam is irradiated.

It should be noted that the following description is made with respect to a laser treatment as an example.

The correction means 44 receives a smearing component output from the waveform shaping means 48 and an original image and outputs the original image from which the smearing component is removed or reduced.

The control means 45 is provided in order to ensure the correcting operation executed by the correction means 44. As a condition, the correcting operation control means 50 of the control means 45 carries out a correcting operation only when a laser beam as a high luminance light beam is irradiated and otherwise causes the original image to be output as it is without execution of the correcting operation.

Further, as another condition, the control means 45 controls whether or not a correcting operation is to be carried out or not depending upon whether it is carried out at a position where a smearing component occurs in an original image. Therefore, the determination means 49 compares an output from the correlation calculation means 46, i.e., an image from which a component caused by a light beam which is out of an object and has no relation with the occurrence of smearing with the original image so that the correcting operation is permitted only at a position where smearing occurs.

With the above arrangement, this embodiment can remove a smearing component more securely and more accurately.

Next, an arrangement of this embodiment will be described with respect to a specific endoscope device by way of example.

Figure 6A:
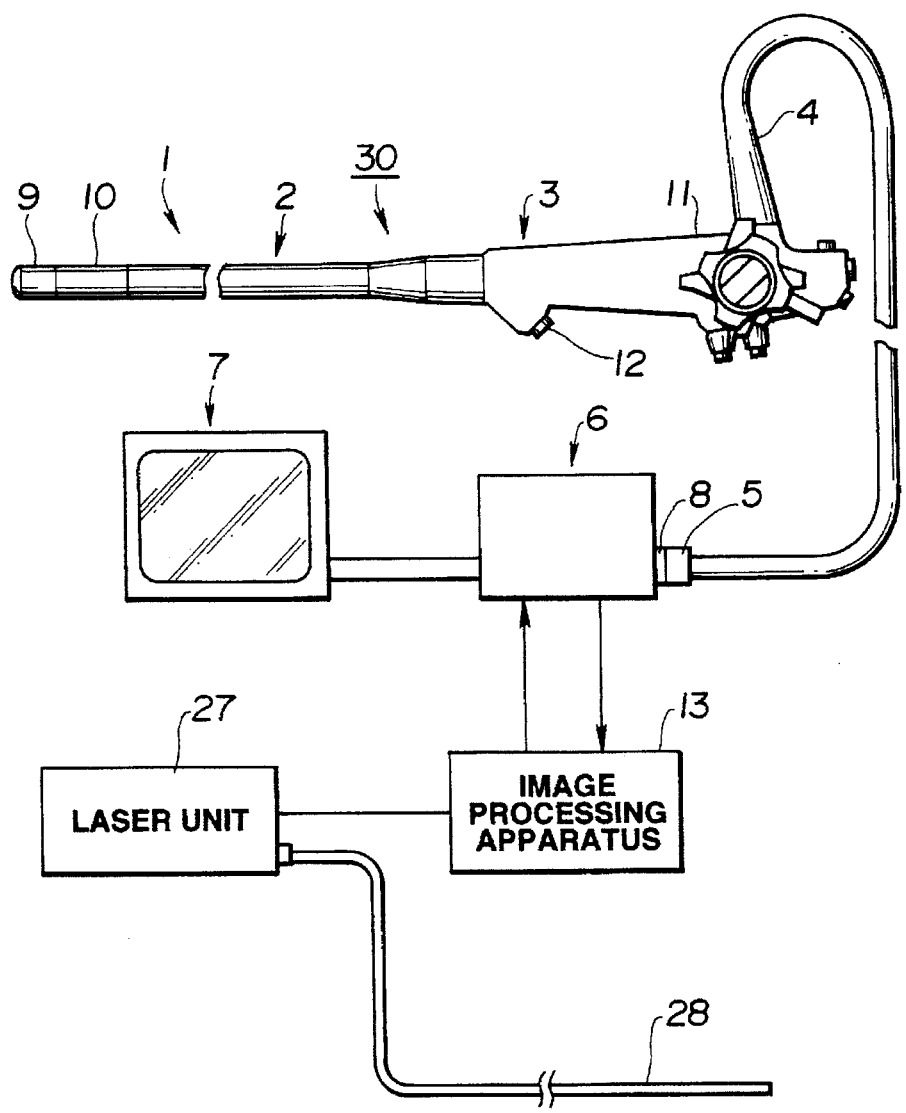
FIG. 6(a) is a view showing the overall arrangement of an endoscope and FIG. 6(b) is a diagram showing the internal arrangement of the extreme end of the endoscope.

As shown in FIG. 6(a), an endoscope device 30 of this embodiment includes a video scope 1 provided with imaging means 41. The video scope 1 has a slender and, for example, flexible inserting portion 2 and the rear end of the inserting portion 2 is continuous to a large diameter operation unit 3. A flexible universal cord 4 laterally extends from the rear end of the operation unit 3 and a connector 5 is mounted at the extreme end of the universal cord 4. The connector 5 is coupled with the connector receiver 8 of a video processor 6 containing a light source and a signal processing circuit. Further, a monitor 7 and an image processing apparatus 13 is connected to the electronic endoscope 1.

Note, the light source and the imaging means may employ any of a so-called simultaneous imaging system using white light and a successively plane imaging system for carrying out an imaging operation by successively irradiating a plurality of wavelength regions in time series.

Figure 6B:
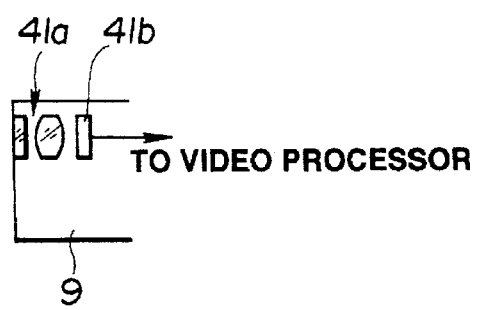

As shown in FIG. 6(b), an objective optical system 41a for focusing the image of a subject and a solid imaging device 41b as imaging means for imaging the image of the subject focused on the objective optical system 41a are disposed at the extreme end of the inserting portion 2 of the electronic endoscope 1 successively from the end thereof. A signal subjected to photo-electric conversion by the solid imaging device 41b is input to the video processor 6 and the image processing apparatus 13.

A charge transfer type CCD and a BBD (bucket bridge device) are included as an example of the solid imaging device 41b. There is an LT (line transfer) system as a system of the CCD in addition to the aforesaid FT system and ILT system, and the LT system is superior to the aforesaid two systems in miniaturization of a chip. Thus, in the field of an endoscope one of the important problems of which is to relieve a pain of a patient, the inserting portion can be made slender by employing an LT system CCD and thus this type of the CCD is very suitable for the field.

Figure 7:
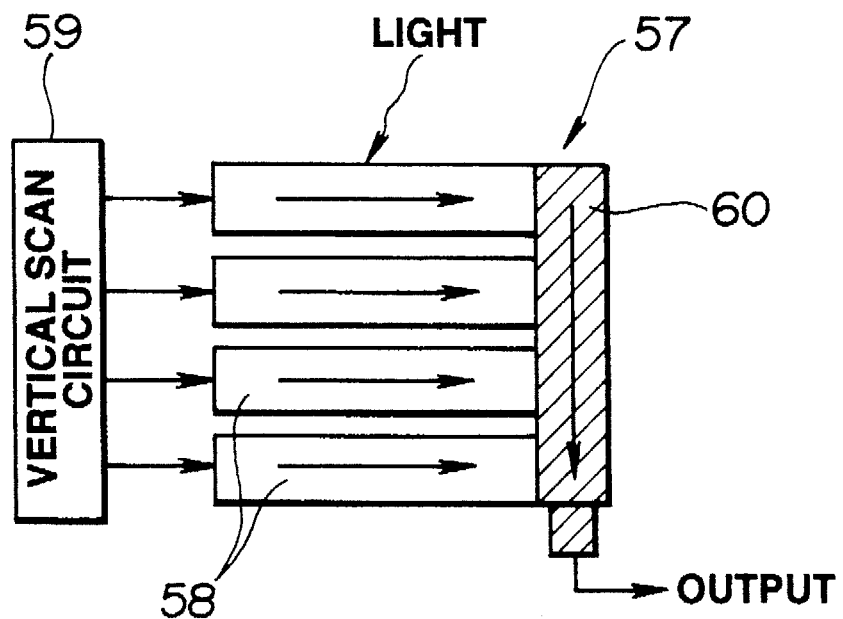

An LT system CCD 57 shown in FIG. 7 includes photosensitive/transfer units 58 which share a photosensitive unit having a plurality of picture element cells for subjecting an incident light beam to photo-electric conversion and a transfer unit for transferring charge accumulated in the photosensitive unit, a vertical scan circuit 59 for outputting a signal for reading accumulated charge to the photosensitive/transfer units 58 and an output unit 60 composed of a reading register and the like for outputting the transferred charge from the photosensitive/transfer units 58.

The LT system CCD 57 is excellent in that it can reduce a chip size because it shares the photosensitive unit and the transfer unit. On the other hand, the LT system CCD 57 is liable to cause smearing because a reading drive clock is made complex and the sharing is employed. Thus, it is difficult to provide a smearing preventing arrangement in an imaging device.

A hard extreme end portion 9 is provided at the extreme end of the endoscope inserting portion 2 and a curving portion 10 capable of being curved is successively disposed backwardly of the extreme end portion 9 adjacent thereto. The curving portion 10 can be curved leftward, rightward, upward and downward by rotating a curving operation knob 11 provided with the operation unit 3. A inserting port 12 is defined to the operation unit 3 and communicates with a treatment device channel (not shown) disposed in the inserting portion 2. The inserting port 12 of the treatment device channel is also used as an inserting path of a laser beam guiding laser probe 28 to be connected to a laser oscillator 27.

The image processing apparatus 13 connected to the video processor 6 is an apparatus capable of removing or reducing smearing from an original image output from the solid imaging device 41 when a laser beam is irradiated. The image processing apparatus 13 reduces or removes smearing caused by the irradiation of the laser beam from an image to be observed and then supplies the image signal of the image to be observed to the video processor 6. As a result, an image obtained by reducing or eliminating smearing from the image to be observed when the laser beam is irradiated is displayed on the monitor 7 connected to the video processor 6.

Next, an arrangement of the image processing apparatus 13 capable of removing smearing will be described.

Figure 8:
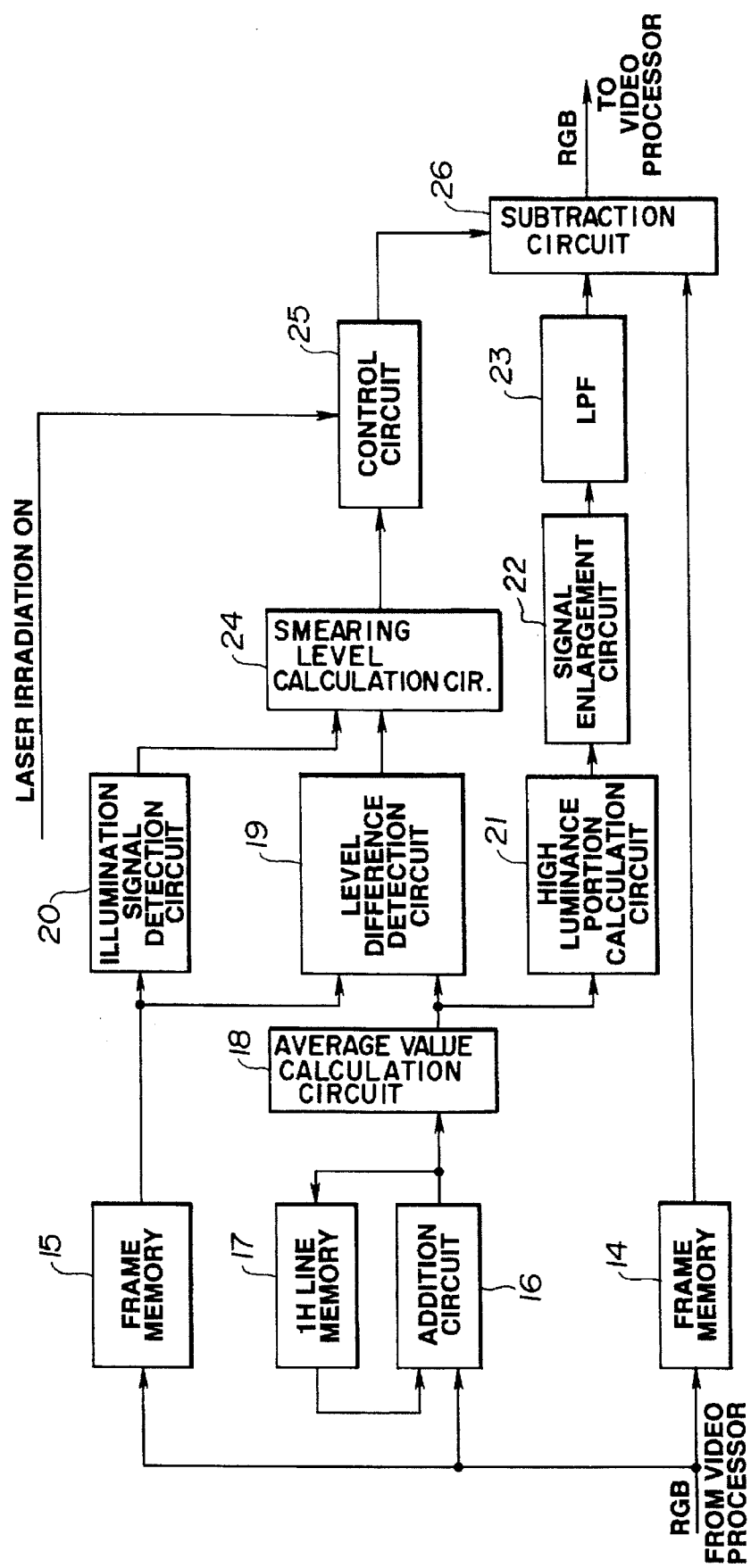

FIG. 8 shows a block diagram of the arrangement of the image processing apparatus.

The image processing apparatus 13 includes a frame memory 14 for delaying RGB image data from the video processor 6 by a time required for a signal processing to be described below and a frame memory 15 for storing one frame of the RGB image data. Further, the image processing apparatus 13 includes an addition circuit 16 for adding image signal levels at the same horizontal position in an RGB image for respective pixel units to calculate an average of the image signal levels, an 1H (one horizontal scan period) line memory 17 for storing an output for 1H from the addition circuit 16, and an average value calculation circuit 18 for calculating average values for the respective same horizontal positions for respective fields and holding data for one field period.

The addition circuit 16, the 1H line memory 17 and the average value calculation circuit 18 constitute the correlation calculation means 46.

The frame memory 15 stores the RGB image data for one frame period from the video processor 6 to output image data of the same time as the image data calculated by the average value calculation circuit 18.

The image processing apparatus 13 further includes a level difference calculation circuit 19 for calculating a level difference between image data from the frame memory 15 and an average value of an image signal level at the same horizontal position calculated by the average value calculation circuit 18, a luminance signal calculation circuit 20 for calculating luminance information of an image stored by the frame memory 15, and a smearing level calculation circuit 24 for calculating as smearing a position whose level difference calculated by the level difference calculation circuit 19 is equal to or less than a predetermined value and whose luminance signal level calculated by the luminance signal calculation circuit 20 is equal to or greater than a predetermined value.

The image processing apparatus 13 further includes a control circuit 25 as the correcting operation control means 50 for controlling a correction level of smearing based on a laser irradiation signal from the laser oscillator 27 and a result of calculation of the smearing level calculation circuit 24.

Note, the level difference detection circuit 19, the luminance signal detection circuit 20 and the smearing level calculation circuit 24 constitute the determination means 49.

In addition to the above arrangement, the image processing apparatus 13 includes a high luminance portion calculation circuit 21 as the smearing component detection means for calculating a high luminance portion by using a predetermined slice level rs based on an average value of horizontal image signals calculated by the average value calculation circuit 18, a signal enlargement circuit 22 for enlarging a signal level of the high luminance potion calculated by the high luminance portion calculation circuit 21, an LPF 23 for restricting a band of a signal enlarged by the signal enlargement circuit 22, and a subtraction circuit 26 for subtracting an output from the LPF 23 from an image signal of an original image recorded to the frame memory 14 according to a control signal of the control circuit 25.

Note, the signal enlargement circuit 22 and the LPF 23 constitute the waveform shaping means 47.

Figure 9:
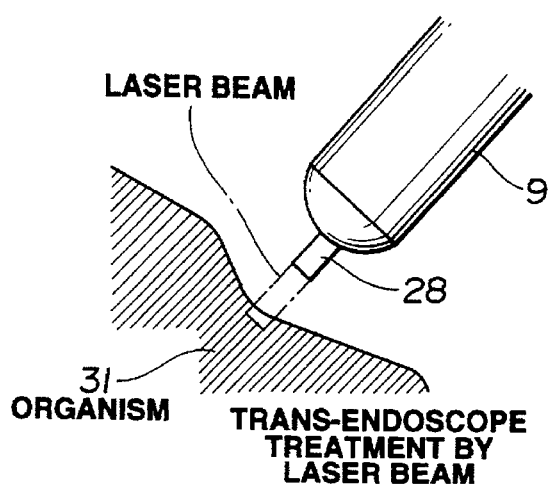

FIG. 9 shows a view in which a trans-endoscope treatment is carried out to an organism 31 by a laser beam by inserting a laser probe 28 up to the extreme end of an endoscope. The laser probe 28 is inserted up to the extreme end of the endoscope through the treatment device channel of the endoscope system shown in FIG. 6(a) and then transmits a laser beam from the laser oscillator 27. A medical treatment such as a cutting-off of organism structure, hemostats and the like is carried out by the laser beam through the laser probe 28.

The video scope 1 in this embodiment obtains a good image by shading an illumination light beam during a transfer period of the CCD as the imaging means. On the other hand, when a laser beam is to be irradiated, it is irradiated even during the transfer period of the CCD. As a result, smearing S is caused in a longitudinal (transfer) direction by the laser beam L, as shown in the upper view of FIG. 10.

Since a light beam in a non-visible region such as infrared radiation or the like is generally used as the laser beam L, a position to which the laser beam is irradiated cannot be visually confirmed. To cope with this problem, a guide beam G as a visible light beam is irradiated to indicate a range or a position to which the laser beam is irradiated. The guide beam G is irradiated at all times from a preparatory step of laser irradiation and the laser beam is emitted while the guide beam G is caused to stay at a target position.

An endoscope image composed of an image signal output from the CCD as the imaging means is input to the image processing apparatus 13 from the video processor 6. When an image signal of a first line is input to the 1H line memory 17, nothing is recorded in the 1H line memory 17. As a result, the value is output from the addition circuit 16 as it is and recorded to the 1H line memory 17. Next, an image signal of a second line is added to the image signal of the first line at the same horizontal position by the addition circuit 16 and a result of the addition is recorded again to the 1H line memory 17. In the same way, image signals are cumulatively added for a period of one frame and obtained image signals are divided by the number of lines cumulatively added by the average value calculation circuit 18 to thereby calculate an average value of a signal level at the same horizontal position as shown in the lower view of FIG. 10 and the value is held for one frame period.

A principle by which smearing is produced by the irradiation of a laser beam is that respective pixels are exposed by a laser beam during a transfer period, as already described with respect to the CCD as the charge transfer system device. As a result, a high luminance white band having a certain level occurs vertically in a screen and a position where smearing occurs has a high level even in an average image signal. On the other hand, since halation H caused by an illumination light beam occurs as an isolated point, the affect of the halation H can be removed as a component of a light beam out of an object by calculating average values for respective transfer directions as the aforesaid correlation functions. That is, a luminance level of determined average values is not almost increased even if they are compared with a case without halation.

The level difference detection circuit 19 compares an average value held by the average value calculation circuit 18 with an original image signal of the frame memory 15 by which the average value is calculated to thereby calculate the correlation thereof.

Operation of the average value calculation circuit 18 will be described with reference to FIG. 11.

An image signal of tunica mucosa of organism 31a shown by oblique lines in the upper view of FIG. 11 is output from the frame memory 15 as an original signal shown by the lower portion of FIG. 11 and output as an average signal shown in the middle portion of FIG. 11 through the average value calculation circuit 18. There is a very large level difference between the average signal and the original signal at the position of halation H and a level difference of other portion of the signal shown in the middle portion of FIG. 11 is small as compared with that of the halation portion H. Note, similarly to the lower view of FIG. 10, the middle portion of FIG. 11 is a graph of an average value of signal levels at the same horizontal position which is an output from the average value calculation circuit 18 in an image shown in the upper view of FIG. 11. Further, the lower view of FIG. 11 is a waveform diagram of a signal level on a dotted horizontal line shown in the upper view of FIG. 11.

Next, a luminance signal is calculated from the original image signal of the frame memory 15 by the luminance signal calculation circuit 20 and input to the smearing level calculation circuit 24. On the other hand, since an output from the level difference detection circuit 19 is obtained by calculating a portion having a small level difference between the original signal and the average signal, the output is input to the smearing level calculation circuit 24 as a signal from which the halation portion H is removed.

The smearing level calculation circuit 24 determines a high luminance portion having a small level difference between the original signal and the average signal as a portion having a high smearing level. Therefore, the halation portion H, the portion of the tunica mucosa of organism 31a and a dark portion 31b of the upper view of FIG. 11 are removed and only a smearing portion S caused by a laser beam is detected.

On the other hand, the average value calculated by the average value calculation circuit 18 is supplied to the high luminance portion calculation circuit 21 and an image signal having a slice level equal to or higher than the predetermined slice level rs as shown in FIG. 12(a) is calculated by the high luminance portion calculation circuit 21 as shown in FIG. 12(b). A signal level of the image signal calculated by the high luminance portion calculation circuit 21 is amplified by the enlargement circuit 22 and a band of the image signal is restricted by the LPF 23 so that the image signal is corrected to a signal having a signal waveform whose lower portion is a little widened as shown in FIG. 12(c).

The control circuit 25 operates the subtraction circuit 26 only when a laser beam is irradiated by the laser oscillator 27. With this control, the subtraction circuit 26 subtracts a smearing correction signal calculated by the LPF 23 from an original image output from the frame memory 14 according to a smearing level calculated by the smearing level calculation circuit 24.

As described above, only a smearing component caused by the irradiated laser is removed from the image signal of the lower view in FIG. 11 as shown in FIG. 12(d) and the halation portion remains as it is. Therefore, an image in which smearing S is caused by a laser beam as shown in FIG. 13(a) becomes an image from which the smearing S is removed as shown in FIG. 13(b).

Although this embodiment is arranged to output only a corrected image, if original image data prior to correction is recorded when an image is recorded, an image subjected to the processing and an image not subjected to the processing can be confirmed.

The operation of the above arrangement can be roughly summarized as follows. An average signal calculated by the average value calculation circuit 18 based on cumulated value data obtained by the 1H line memory 17 and the addition circuit 16 is processed such that the halation portion H is removed from the average signal and then only a smearing component which is equal to or greater than a predetermined level, i.e., which has high luminance is extracted and slightly corrected by the signal enlargement circuit 22 and the LPF 23, that is, correction is executed to widen the lower low level portion of the extracted and amplified component. The 1H line memory 17, the addition circuit 16, the average value calculation circuit 18, the high luminance portion calculation circuit 21, the signal enlargement circuit 22 and the LPF 23 constitute smearing component extraction means. Further, a smearing component is removed from an original image by the subtraction circuit 26 constituting the correction means.

At this time, the control circuit 25 operates the subtraction circuit 26 at a position where an output from the smearing level calculation circuit 24 is detected, that is, at a position where not the halation portion H but only the high luminance smearing portion is detected and further only when a laser beam is irradiated. The control circuit 25 prevents the faulty operation of the subtraction circuit 26 caused by the effect of halation and the like.

As described above, according to this embodiment, smearing caused by a treatment carried out by using a laser beam and a high luminance light beam such as a laser beam and the like is removed so that the quality of an obtained image can be improved even if a laser treatment and the like are carried out. Accordingly, this embodiment can improve an observation capability when a laser treatment is carried out or when a high luminance light beam is irradiated, and since the laser treatment is properly carried out, fatigue can be reduced in diagnosis and treatment.

Although this embodiment is particularly efficient in relation to an LT system CCD in which smearing eminently occurs, it can effectively improve image quality when a CCD of other systems is used or when other imaging means suffering from the effects of smearing is used.

Further, this embodiment can effectively remove or eliminate smearing from a recorded image, which cannot be achieved when an arrangement for preventing or reducing the occurrence of smearing is provided in imaging means.

Note, even if a light beam from a laser probe directly impinges on an imaging device, a smearing component can be reduced.

FIG. 14 to FIG. 17(b) relate to a second embodiment of the present invention, wherein FIG. 14 is a block diagram of an image processing apparatus, the upper portion of FIG. 15 is a view showing an image in which smearing is caused by halation and a guide beam, the lower portion is a diagram showing an image signal level in a horizontal direction, FIG. 16(a)–FIG. 16(d) are waveform diagrams explaining a correcting operation of a smearing component, FIG. 17(a) is a view of an original image containing smearing and the like caused by halation and a guide beam, and FIG. 17(b) is a view for comparing an original image with a corrected image.

According to this embodiment, since a guide beam is irradiated at all times, a smearing component can be properly removed by removing a smearing component caused only by the guide beam as well as removing a smearing component caused when a laser beam is irradiated. As a result, according to this embodiment a criterion for detecting a smearing component and shaping a waveform is changed depending upon whether only a guide beam is irradiated or whether both a laser beam and a guide beam are irradiated as well as a criterion for determination carried out by control means is also changed, different from the first embodiment.

The image processing apparatus shown in FIG. 14 includes a luminance signal detection circuit 35, a high luminance portion calculation circuit 36 and a signal enlargement circuit 37 in place of the luminance signal detection circuit 20, the high luminance portion calculation circuit 21 and the signal enlargement circuit 22 of the first embodiment shown in FIG. 8.

The luminance signal detection circuit 35 is different from the circuit 20 of the first embodiment in that a laser irradiation ON/OFF signal is input to the circuit 35 so that a luminance level detected from an image signal read from the frame memory 15 is controlled according to the ON/OFF state of a laser beam to be irradiated. More specifically, when a laser irradiation is turned OFF, the luminance signal detection circuit 35 sets a reference level according to a guide beam, whereas when the laser irradiation is turned ON, the circuit 35 changes the criterion level according to a laser beam having higher luminance and calculates a luminance signal.

Further, the high luminance portion calculation circuit 36 also changes a smearing component detecting condition according to the ON/OFF state of the laser beam to be irradiated, and the signal enlargement circuit 37 also changes a waveform shaping condition in the same way.

The same numerals are used to denote the same arrangement and operation as those of the first embodiment and their description is omitted.

In the above arrangement, a guide beam G is irradiated to confirm a position to which a laser beam is irradiated in a treatment carried out by using the laser beam as shown in the upper view of FIG. 15. Although the guide beam G has a quantity of light smaller than that of an irradiated laser beam, since it is illuminated during a period when a usual illumination light beam is shaded, smearing shown by S' in the upper view of FIG. 15 is caused to an image to be observed the guide beam and thus the quality of the image to be observed is damaged.

When a laser treatment is carried out, a luminance signal level of the smearing S' caused by the guide beam G is different from that of smearing S caused by the irradiation of the laser beam. Accordingly, when only the guide beam is irradiated (although it is in a process of the laser treatment, the laser beam is not irradiated), the high luminance portion calculation circuit 36 sets a second slice level rs' therein as shown in the lower view of FIG. 15 and FIG. 16(a). The high luminance portion calculation circuit 36 detects a smearing S' component caused by the guide beam G whose luminance is lower than that of the laser beam L being irradiated and higher than that of a usual image level. The smearing component shown in FIG. 16(b) which is caused by the guide beam G and detected by the high luminance portion calculation circuit 36 is enlarged by the signal enlargement circuit 37 and then supplied to the subtraction circuit 26 through the LPF 23 as a signal shown in FIG. 16(c). The subtraction circuit 26 removes or reduces the smearing component caused by the guide beam G from an original image and then outputs the original image to the video processor 6. Note, the signal enlargement circuit 37 carries out amplification so as to retain luminance information to such a degree that even if the smearing S' is removed, the guide beam G can be observed in a corrected image.

In a laser ON state in which the laser beam and the guide beam are irradiated together, the high luminance level calculation circuit 36 is changed to the first slice level rs which is set to a higher level similarly to the first embodiment. The signal enlargement circuit 37 amplifies a signal at the same level as that of the first embodiment.

On the other hand, the luminance signal detection circuit 35 sets, for example, the slice level rs' therein. With this setting, the smearing S' caused by the guide beam G whose luminance is lower than that of the laser beam L being irradiated and higher than that of a usual image level is detected by the smearing level calculation circuit 24.

When the laser irradiation is turned OFF, the subtraction circuit 26 removes only the smearing S' caused by the guide beam G from the original image by the control executed by the control circuit 25 as shown in FIG. 17 (b).

On the other hand, when the laser beam is irradiated (laser irradiation is turned ON), the setting of the slice level rs is changed.

Note, when the laser beam is outside a visible light region (for example, infrared radiation) and laser beam cut means (cut filter) for cutting a laser beam is mounted on the eyepiece system of a video scope, smearing caused by a guide beam in a visible light region may be greater than smearing caused by the laser beam.

A treatment laser generally uses a wavelength of a near infrared region. Accordingly, there is an electronic endoscope arranged to restrict the occurrence of smearing even if a laser beam is irradiated during a transfer period of a CCD by inserting an infrared cut filter, which absorbs or reflects near infrared, to the objective optical system at the extreme end of the electronic endoscope. Note, this electronic endoscope cannot be used together with an instrument for measuring a saturated degree of oxygen in hemoglobin due to the aforesaid spectral characteristics. This is because that detection is carried out by making use of a difference of a degree of absorbance between oxyhemoglobin and deoxyhemoglobin.

In any event, when the guide beam is discussed, since a light beam within a visible light region which can be observed by eyes is used to confirm a position to which a near infrared laser beam, which cannot be observed by a doctor as an operator, is irradiated, the light beam must be irradiated at all times (at least from the preparatory step of laser irradiation).

To cut a guide beam which is a light beam in a visible range in the objective optical system of an electronic endoscope means that a usual endoscope image cannot be obtained. Accordingly, such a cut filter cannot be of course, inserted. Although a guide beam has an energy which is very small as compared with that of a laser beam, it may cause large smearing to a CCD.

As described above, in the case of an endoscope provided with an infrared cut filter, smearing caused by a guide beam is sometimes greater than smearing caused by an irradiated laser beam. In such a case, it is preferable that the aforesaid slice level is changed depending upon whether observation is carried out by an endoscope to which a countermeasure for a laser beam is taken or it is carried out by using an endoscope which is not provided with cut means.

When the arrangement of this embodiment is connected to an endoscope including cut means, a doctor may turn ON/OFF a smearing correction processing when he carries out a laser treatment regardless of that a laser beam is turned ON or OFF.

Further, when the doctor does not carry out an ON/OFF operation but smearing is detected by the level difference detection circuit 19, a smearing correction processing may be automatically carried out by controlling the control circuit 25.

On the other hand, when a wavelength of a treatment laser beam is not in a near infrared region but is a visible light beam, the aforesaid endoscope provided with the cut means becomes useless. Then, smearing caused when a laser beam is irradiated is always greater than that caused when a guide beam is irradiated, which can be coped with the arrangement shown in FIG. 14.

According to this embodiment, with the aforesaid arrangement and operation, not only smearing caused by an irradiated laser beam but also smearing caused by a guide beam are corrected and the deterioration of an image to be observed is corrected and the image to be observed for the execution of a laser treatment is improved so that the treatment can be easily carried out.

This invention is also applicable to the removal of smearing caused by an externally mounting camera capable of being mounted on the eyepiece unit of a fiber scope, smearing at the high luminance portion of a simultaneous imaging system, and the like in addition to the removal of smearing caused by a video scope. Further, imaging means such as the video scope and the like may be a successively plane imaging system.

Further, the aforesaid smearing is caused not only by an irradiated laser beam and a guide beam for it but also by other high luminance light beams depending upon a luminance level thereof and the apparatus of the present invention also exhibits an effect on such a case. For example, the apparatus can remove or reduce smearing caused by a light beam emitted from the prove of an instrument making use of the aforesaid spectral characteristics.

Further, the present invention effectively improves image quality deteriorated by blooming.

According to the present invention, it is apparent that various different types of embodiments can be realized based on the spirit of the present invention. The present invention is only restricted by the accompanying claims and not restricted by the specific embodiments thereof.

What is claimed is:

1. An image processing apparatus for an endoscope, comprising:

smearing component extraction means for extracting a smearing component caused by a high luminance light beam from an original image composed of an image signal of a subject to be imaged, wherein said smearing component extraction means takes predetermined correlations with respect to luminance information in respective directions in which smearing occurs in the original image composed of said image signal, removes components having a small correlation value in said directions, and then extracts a smearing component of an image signal output from an imaging means which receives a light beam from a subject and subjects the light beam to photo-electric conversion or a smearing component of an image signal output from image record/reproduction means for recording an output from said imaging means; and correction means for correcting said original image composed of said image signal by use of the signal of said smearing component extracted by said smearing component extraction means.

2. An image processing apparatus for an endoscope according to claim 1, wherein said smearing component extraction means removes components having a luminance value equal to or greater than a predetermined value and then detects said smearing component.

3. An image processing apparatus for an endoscope according to claim 1, wherein said smearing component extraction means determines correlation values indicating whether or not a predetermined value for making luminance levels substantially uniform appears in respective directions in which smearing occurs as said predetermined correction and extracts a portion where said correlation values are equal to or greater than a predetermined level as a smearing component.

4. An image processing apparatus for an endoscope according to claim 3, wherein said smearing component extraction means determines average values of luminance in respective directions in which said smearing occurs as said correlation values and extracts a high luminance portion having a luminance level equal to or greater than a predetermined level from said average values as a smearing component.

5. An image processing apparatus for an endoscope, comprising:

smearing component extraction means for extracting a smearing component caused by a high luminance light beam from an original image composed of an electric signal output from imaging means for receiving a light beam and subjecting said received light beam to photoelectric conversion, wherein said smearing component extraction means determines average values of luminance information in respective transfer directions and extracts a portion where said average values are equal to or greater than a predetermined value as a smearing component; and correction means for correcting said electric signal output from said imaging means by use of the signal of said smearing component extracted by said smearing component extraction means.

6. An image processing apparatus for an endoscope according to claim 5, wherein said imaging means is a solid-state imaging device for transferring and outputting charge obtained by subjecting a received light beam to photo-electric conversion.

7. An image processing apparatus for an endoscope according to claim 6, wherein said solid-state imaging device is a line transfer type device and includes a photosensitive/transfer unit sharing a photosensitive unit for obtaining charge by subjecting an incident light beam to photoelectric conversion and a transfer unit for transferring said charge accumulated by said photosensitive unit, a vertical scan circuit for outputting a signal for reading said charge to said photosensitive/transfer unit, and an output unit for outputting said charge read by said vertical scan circuit and transferred from said photosensitive/transfer unit.

8. An image processing apparatus for an endoscope according to claim 5, wherein said smearing component extraction means extracts a smearing component caused by a light beam having a wavelength within a received photo-sensitive range in said imaging means for carrying out photo-electric conversion.

9. An image processing apparatus for an endoscope according to claim 5, wherein said imaging means has a plurality of pixels disposed on an imaging surface and transfers signals subjected to photo-electric conversion for said plurality of pixels to an output unit; and said smearing component extraction means uses luminance information obtained from a plurality of pixels disposed along directions in which signals to be output are transferred, said signals having been subjected to said photo-electric conversion by said imaging means so that said smearing component extraction means determines correlation values indicating whether or not said luminance information obtained from the plurality of said pixels disposed along said transfer directions has a value uniformly equal to or greater than a predetermined luminance level in said respective transfer directions and extracts a high luminance portion showing a high correlation value as a smearing component.

10. An image processing apparatus for an endoscope according to claim 5, wherein said correction means consists of a subtraction means for subtracting a smearing component output from said smearing component extraction means from an original image composed of an electric signal output from said imaging means.

11. An image processing apparatus for an endoscope according to claim 5, wherein said imaging means includes a plurality of pixels disposed on an imaging surface and transfers signals having been subjected to photo-electric conversion for said plurality of pixels to an output unit; and said smearing component extraction means includes correlation calculation means for determining predetermined correlation functions in directions in which smearing occurs in said imaging means from an original image composed of an electric signal output from said imaging means and removing a component having said correlation functions of a small value in the directions in which smearing occurs and smearing component detection means for detecting, as said smearing component, values equal to or greater than a predetermined luminance level from an image from which a relevant component is removed by said correlation calculation means.

12. An image processing apparatus for an endoscope according to claim 11, wherein said correlation calculation means removes a component caused by a high luminance light beam, which is out of an object and does not cause smearing, of said high luminance light beams by calculating values of said correlation functions.

13. An image processing apparatus for an endoscope according to claim 11, wherein said correlation calculation means uses luminance information obtained from a plurality of pixels disposed along directions in which signals to be output are transferred, said signals having been subjected to said photo-electric conversion by said imaging means so that said correlation calculation means determines a correlation indicating whether values equal to or greater than a predetermined luminance level substantially uniformly appear or not in said respective transfer directions in said luminance information and outputs a result of the correlation to said smearing component detection means as a component from which the component caused by the light beam out of the object is removed.

14. An image processing apparatus for an endoscope according to claim 11, wherein said smearing component extraction means includes waveform shaping means for shaping the waveform of an output from said smearing component detection means so that the waveform becomes substantially the same as that of the smearing component in an original image and supplies an output from said waveform shaping means to said correction means as said smearing component.

15. An image processing apparatus for an endoscope according to claim 11, wherein said correlation calculation means consists of an average value calculation means for determining average values in a frame or field unit from respective values of information obtained from a plurality of pixels disposed along respective transfer directions in which signals to be output, which have been subjected to said photo-electric conversion by said imaging means are transferred; and said smearing component detection means detects, as said smearing component, values equal to or greater than a predetermined luminance level from average values in said respective transfer directions determined by said average value calculation means.

16. An image processing apparatus for an endoscope according to claim 11, wherein said imaging means is arranged to dispose a plurality of pixels flat in a horizontal scan direction and a vertical scan direction and to transfer signals, which have been subjected to photo-electric conversion for said respective pixels, to an output unit;

said correlation calculation means includes addition means, memory means and average value calculation means;

said addition means cumulatively adds the information of pixels which are disposed in a horizontal scan direction, said information being successively supplied from said imaging means and the information stored in said memory means;

said memory means stores values obtained by successively and cumulatively adding information from said pixels disposed at the respective same positions in said horizontal scan direction; and said average value calculation means divides said cumulated values at the respective same positions in said horizontal scan direction which have been added by said addition means, by the number of horizontal scan lines.

17. An image processing apparatus for an endoscope according to claim 12, wherein said correlation calculation means removes a halation component caused by an illumination light beam irradiated to a subject to be imaged by said imaging means as a component caused by a high luminance light which is out of an object.

18. An image processing apparatus for an endoscope according to claim 14, wherein said waveform shaping means performs waveform shaping according to a high luminance light beam to be irradiated out of a plurality of specific high luminance light beams and shapes the waveform of said high luminance light beam so that the waveform thereof becomes substantially the same as that of a smearing component in an original image caused by said high luminance light beam.

19. An image processing apparatus for an endoscope comprising:

smearing component extraction means for extracting a smearing component caused by a specific high luminance light beam from an original image composed of an electric signal output from imaging means for receiving a light beam and subjecting said received light beam to photo-electric conversion, wherein said smearing component extraction means determines average values of luminance information in respective transfer directions and extracts a portion where said average values are equal to or greater than a predetermined value as a smearing component; and correction means for correcting said electric signal output from said imaging means by use of said smearing component extracted by said smearing component extraction means.

20. An image processing apparatus for an endoscope comprising:

smearing component extraction means for extracting a smearing component caused by a specific high luminance light beam from an original image composed of an electric signal output from imaging means for receiving a light beam and subjecting said received light beam to photo-electric conversion, wherein said smearing component extraction means determines average values of luminance information in respective transfer directions and extracts a portion where said average values are equal to or greater than a predetermined value as a smearing component;

correction means for correcting said electric signal output from said imaging means by use of said smearing component extracted by said smearing component extraction means; and control means for controlling whether or not said correction means carries out a correcting operation according to at least one of the condition whether or not said specific high luminance light beam is irradiated and the condition whether or not there is a position where smearing is caused by said specific high luminance light beam in an image composed of an electric signal output from said imaging means.

21. An image processing apparatus for an endoscope according to claim 19 or claim 20, wherein said smearing component extraction means extracts at least one of a smearing component caused by a laser beam as said specific high luminance light beam and a smearing component caused by a guide beam as said specific high luminance light beam indicating a range or a position to which said laser beam is irradiated.

22. An image processing apparatus for an endoscope according to claim 8 or claim 20, wherein said smearing component extraction means selectively extracts a smearing component caused by at least one light beam of a plurality of specific high luminance light beams under predetermined conditions set according to a signal indicating whether or not at least one light beam of said high luminance light beams is irradiated.

23. An image processing apparatus for an endoscope according to claim 19 or claim 20, wherein said smearing component extraction means extracts a smearing component by changing a criterion for extracting the smearing according to a signal indicating that a light beam having high luminance is irradiated in one or more high luminance light beams of a plurality of specific high luminance light beams.

24. An image processing apparatus for an endoscope according to claim 22, wherein said smearing component extraction means selectively extracts a smearing component caused by a laser beam and a smearing component caused by a guide beam according to a signal indicating whether or not the laser beam is irradiated in two specific high luminance light beams including the guide beam which indicates a range or a position to which the laser beam is irradiated and is irradiated at all times and the laser beam which is irradiated only when necessary.

25. An image processing apparatus for an endoscope according to claim 24, wherein when said signal indicates that only a guide beam is irradiated, said smearing component extraction means extracts a smearing component caused by the guide beam by changing a criterion to that according to the guide beam, whereas when said signal indicates that both a guide beam and a laser beam are irradiated, said smearing component extraction means extracts a smearing component caused only by the laser beam by changing the criterion to that according to the laser beam.

26. An image processing apparatus for an endoscope according to claim 20, wherein said control means includes:

determination means for determining whether or not a portion, which is located in an image composed of an electric signal output from said imaging means, simultaneously satisfies two conditions that halation is not caused in said portion by a light beam, which is out of an object and does not cause smearing, of said high luminance light beams and that smearing is caused in said portion by a specific high luminance light beam of said high luminance light beams by comparing an output from said smearing component extraction means with an output from said imaging means; and correcting operation control means for controlling a correcting operation in said correction means based on a result of determination of said determination means.

27. An image processing apparatus for an endoscope according to claim 26, wherein said imaging means is arranged to dispose a plurality of pixels to a plane shape in a horizontal scan direction and a vertical scan direction and to transfer signals which have been subjected to photoelectric conversion for said plurality of pixels to an output unit; and said determination means determines whether not halation but smearing occurs or not by comparing an output from said smearing component extraction means with an output from said imaging means for respective horizontal scan lines, said halation being caused by a light beam, which is out of an object and does not cause smearing, of said high luminance light beams and said smearing being caused by said specific high luminance light.

28. An image processing apparatus for an endoscope according to claim 26, wherein when a result of determination of said determination means satisfies said two conditions, said correcting operation control means permits said correction means to carry out a correcting operation in said portion.

29. An image processing apparatus for an endoscope according to claim 26, wherein when said specific high luminance light beam of said high luminance light beams is irradiated and said two conditions are satisfied as a result of determination of said determination means, said correcting operation control means permits said correction means to carry out a correcting operation in said portion.

30. An image processing apparatus for an endoscope according to claim 20, wherein said control means has discrimination means for changing a selection criterion in correspondence with one high luminance light beam to be irradiated of a plurality of specific high luminance light beams and discriminating between a position where smearing is caused by said one high luminance light beam being irradiated and a position where halation is caused by a light beam, which is out of an object and does not cause smearing, of said high luminance light beams and correcting operation control means for controlling a correction operation in said correction means based on a result of discrimination of said discrimination means.

31. An image processing apparatus for an endoscope, comprising:

smearing component extraction means for extracting a smearing component caused by a high luminance light beam from an original image composed of an image signal of a subject to be imaged, wherein said smearing component extraction means takes predetermined correlations with respect to luminance information in respective directions in which smearing occurs in the original image composed of said image signal, said smearing component extraction means removing components having a small correlation value in said directions and a luminance value equal to or greater than a predetermined value, said smearing component extraction means then detecting a smearing component by extracting a portion where a high correlation value is exhibited, thereby producing said smearing component of an image signal output from imaging means which receives a light beam from a subject and subjects the light beam to photo-electric conversion or a smearing component of an image signal output from image record/reproduction means for recording an output from said imaging means; and correction means for correcting said original image composed of said image signal by use of the signal of said smearing component extracted by said smearing component extraction means.

* * * * *